United States Patent [11] 3,604,248

| [72] | Inventors | Heinz C. Altmann;<br>Clifford B. Bushnell; Henry L. West;<br>Thomas O. Lange, all of Rochester, N.Y. |
|---|---|---|
| [21] | Appl. No. | 852,719 |
| [22] | Filed | Aug. 25, 1969 |
| [45] | Patented | Sept. 14, 1971 |
| [73] | Assignee | Eastman Kodak Company<br>Rochester, N.Y. |

[54] APPARATUS AND METHODS FOR DETERMINING IMBALANCE
9 Claims, 7 Drawing Figs.

[52] U.S. Cl. .................................................. 73/66,
 33/174
[51] Int. Cl. ........................................................ G01m 1/00,
 G01m 1/14
[50] Field of Search ............................................ 73/66, 457,
 462, 487; 33/174 L, 174 Q

[56] References Cited
UNITED STATES PATENTS
| 1,744,431 | 1/1930 | Wood ............................. | 73/480 |
| 3,222,791 | 12/1965 | Huntley et al. ................ | 33/174 |

Primary Examiner—Richard C. Queisser
Assistant Examiner—Herbert Goldstein
Attorneys—Walter O. Hodsdon and Robert F. Cody ABSTRACT: Radial variations about the periphery of an element are the basis for determining the imbalance of such member. Such variations are resolved into vector components; and integrated over a single traversal of such periphery. The technique is used to determine web roll imbalance; and dimensional growth of the roll is accommodated by use of a positional pickoff. Positioning of the pickoff is used to weight the effect of the vector components.

PATENTED SEP 14 1971

HENRY L. WEST
HEINZ C. ALTMAN
CLIFFORD B. BUSHNELL
THOMAS O. LANGE
INVENTORS

BY *Walter O. Hodsdon*

*Robert F. Cody*

ATTORNEYS

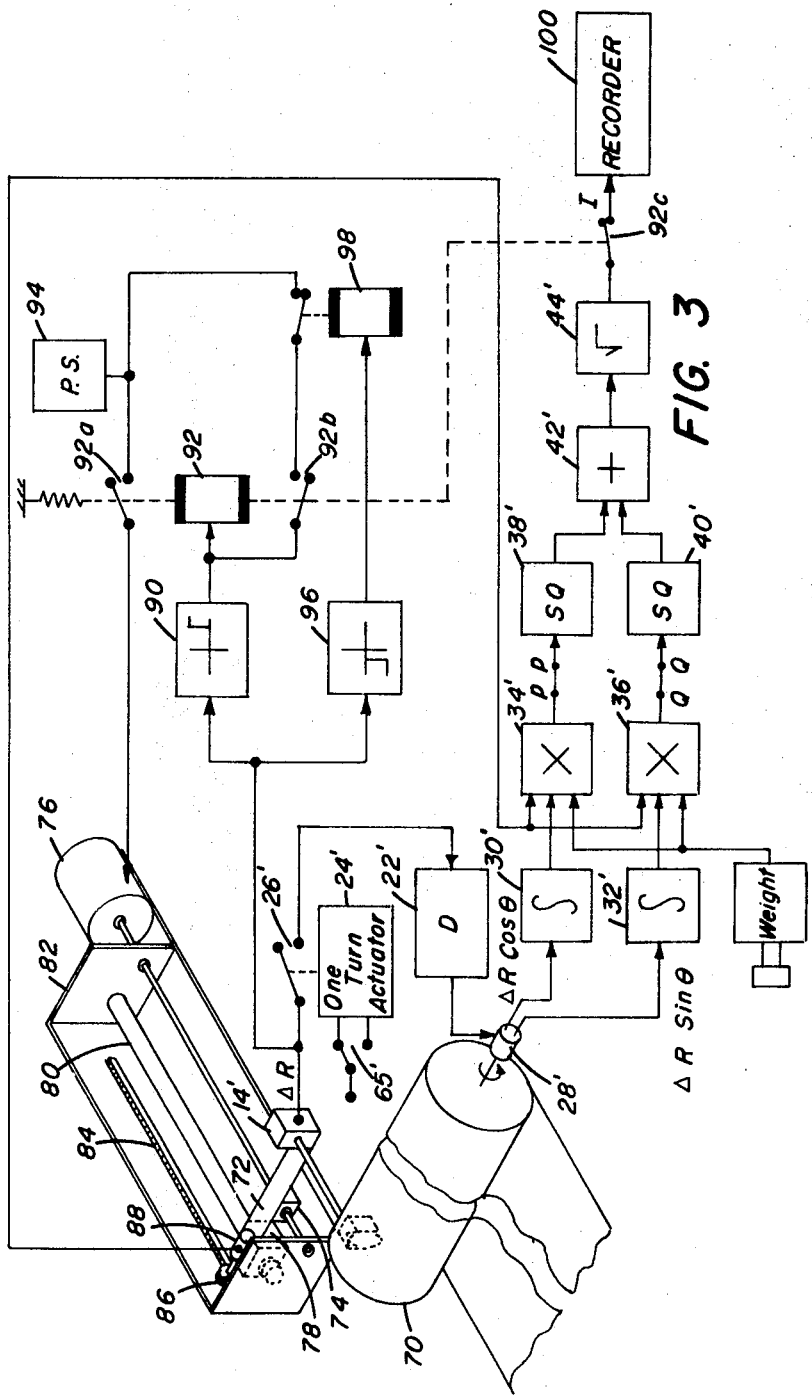
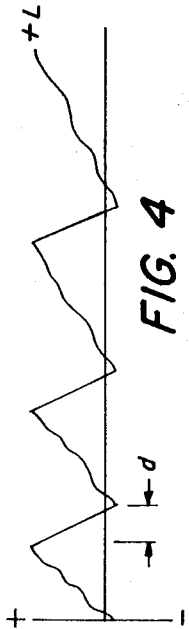

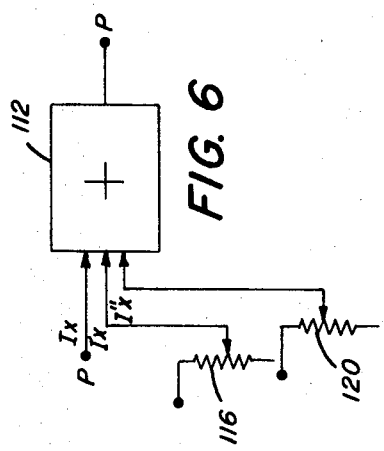
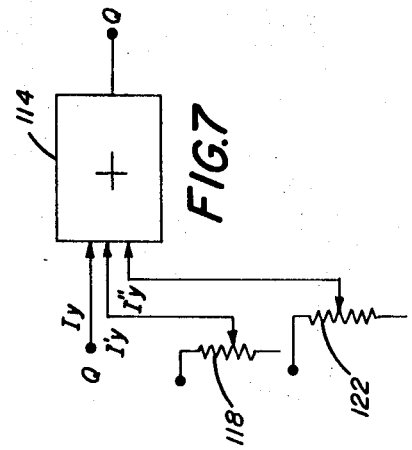
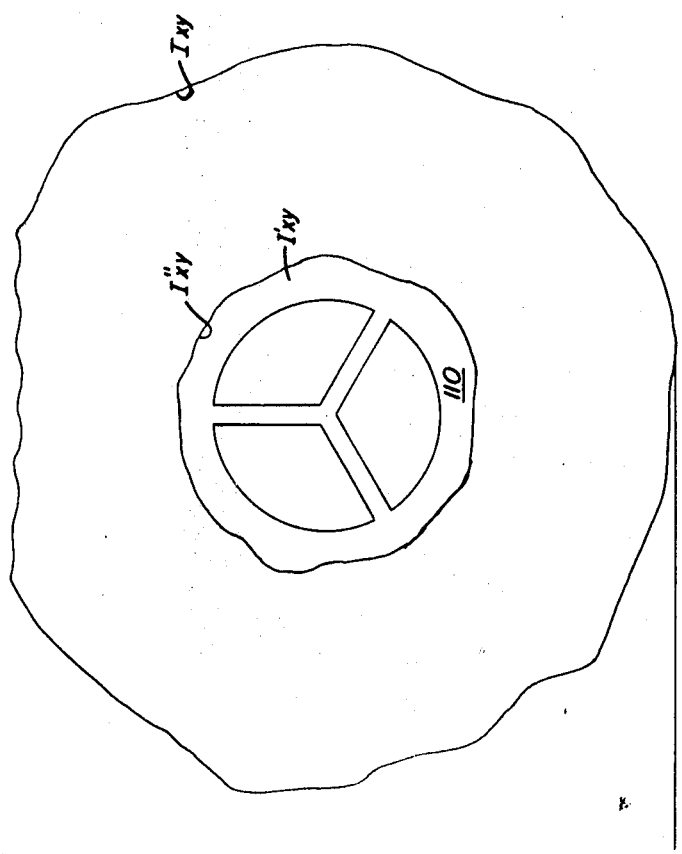
HENRY L. WEST
HEINZ C. ALTMAN
CLIFFORD B. BUSHNELL
THOMAS O. LANGE
INVENTORS
ATTORNEYS

APPARATUS AND METHODS FOR DETERMINING IMBALANCE

BACKGROUND OF THE INVENTION

1. Field of the Invention

This invention relates to apparatus and methods for determining the imbalance of an element. In particular, the invention may be employed to indicate the static imbalance of a web roll as such roll is wound; and to determine static imbalance by reference to dimensional measurements.

2. Description Relative to the Prior Art

Imbalance of a rotary member may be defined as the product of the distance between the center of mass of such member and its rotary axis, multiplied by the weight of such member. Various techniques/apparatus (U.S. Pats. Nos. 2,980,331 and 3,151,485) are known for determining imbalance by examining how imbalance manifests itself, say, in bearing vibration, shaft displacement, etc. Such techniques/apparatus are inherently speed dependent; and therefore they cannot be employed effectively to determine the imbalance of a web roll which is wound to substantially the same tightness throughout, but at gradually decreasing speeds. Also, speed dependent bearing noise, etc. will too frequently mask prior art imbalance determinations as they are made.

The prior art is concerned with determining the unchanging imbalance of a rotary element; but such prior art is not concerned with checking the gradually changing imbalance of a roll; and which changing imbalance may, or may not, vary linearly with roll diameter. It frequently obtains that the quality of a web product is reflected in the balance of a roll wound from such web; and it would therefore be desirable to make periodic determinations of such balance. Prior art apparatus for monitoring the quality of a web product by checking roll imbalance is unknown; and to determine roll imbalance without resort to scales, or speed-dependent factors, is also unknown.

SUMMARY OF THE INVENTION

Apparatus according to the invention determines the imbalance of a rotary element much in the manner that a planimeter determines the area of P—P element: Q—Q in the radial dimension of the element—taken with respect to a nominal radius for the element—during a given traversal about the periphery of such element are resolved into orthogonal vector components; such components are then integrated to produce resultant vectors which may be vectorially combined to produce an imbalance vector, the effect of which is influenced by the magnitude of the nominal radius, and the weight of such element. Such a technique presupposes that the element has uniform density; but such traversal may be at any relative speed.

To determine periodically the imbalance of a roll as it is wound, the indicated nominal radius, preferably, is free to change as the roll grows in size. To this end, a limited-swing pickoff is employed to sense roll radial variations; and such pickoff is periodically repositioned with respect to the growing roll, the overall amount of repositioning being representative of the aforesaid nominal radius which is to be used for a given imbalance determination.

An object of the invention is to provide apparatus/methods for use in dimensionally determining the imbalance of a rotary member.

Another object of the invention is to provide apparatus/methods for determining the quality of a web product by checking the imbalance of a roll wound from such web.

Another object of the invention is to provide improved apparatus/methods for checking the imbalance of a web roll during winding of such roll.

The invention will be described with reference to the figures:

FIG. 3 is a block diagram illustrating another embodiment of the invention,

FIG. 4 is a diagram useful in describing the apparatus of FIG. 3,

FIG. 5 is a cross-sectional view of a web roll, the imbalance of which is determined according to the invention, and FIGS. 6 and 7 illustrate circuits cooperative with the apparatus of FIG. 3 for practicing an embodiment of the invention.

Figure 1:
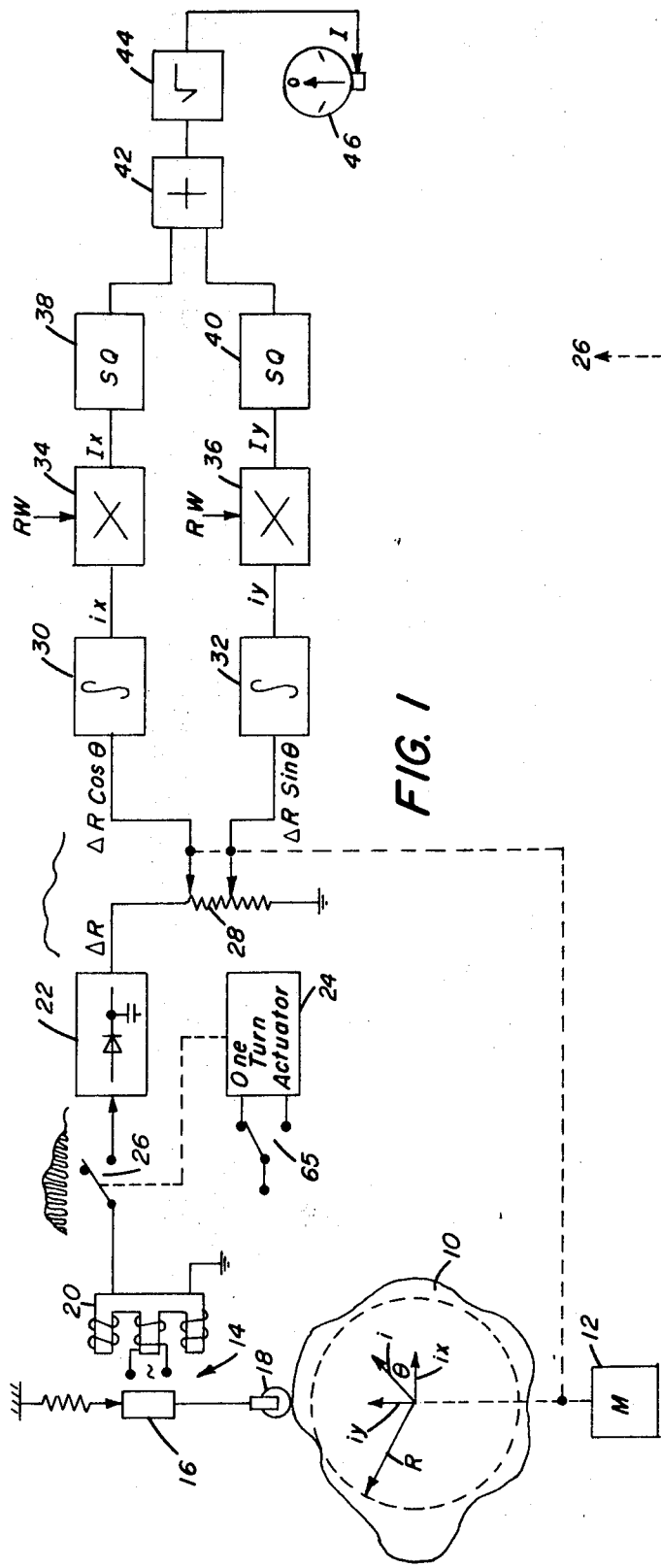
FIG. 1 is a block diagram illustrating one embodiment of the invention.

Referring to FIG. 1, a homogeneous member 10, the imbalance of which is to be determined, is rotated, for example, by a motor 12. The member 10 has a nominal radius R, and variations $\Delta R$ with respect to such radius are detected by a pickoff 14. The pickoff 14 is essentially a differential E-transformer the armature 16 of which is provided with a roller 18 which is spring loaded against the periphery of the member 10. Radial variations $\Delta R$ modulate the output from the stator 20 of the pickoff 14; and such modulation is detected by means of a demodulator 22.

As above stated, imbalance of the member 10 is determined from a given traversal of the pickoff 14 about the periphery of the member 10. To this end, a one-turn actuator 24 is provided to close a switch 26 for as long as is necessary for the motor 12 to rotate the member 10 through 360 degrees, i.e., the speed of rotation plays no part in determining imbalance in accordance with the invention.

The detected $\Delta R$ signal output from the demodulator 22 is resolved—as the member 10 is rotated—into $x$ and $y$ vector components thereof (viz $\Delta R \cos\theta$ and $\Delta R \sin \theta$, where $\theta$ represents the angular departure of the member 10 from a reference) by means of a resolver 28. The resolver 28 may be a sin-cos potentiometer having its wipers rotated in unison with the member 10. Integrators 30, 32 are employed to integrate the $x$ and $y$ vector component signals, respectively, thereby to produce resultant signals $i_x$ and $i_y$.

The moment which the resultant vector signals $i_x$, $i_y$ cooperate to produce is determined by the lever (radius R) through which such vectors operate, and by the weightiness (W) of the member 10. Accordingly, the vector signals $i_x$, $i_y$ are modified (multipliers 34, 36) as functions of the nominal radius R and the weight W of the member 10, thereby to produce imbalance moments $I_x$, $I_y$; and which imbalance moments may be vectorially added to produce the imbalance signal $I$. Vectorially adding the imbalance components $I_x$, $I_y$ is straightforward (viz $I=\sqrt{I_x^2+I_y^2}$); and squaring devices (38,40) a summing device 42, and a square root device 44 may be employed for such vector addition. The resultant imbalance vector signal $I$ may be applied to an indicator 46 for display purposes.

Figure 2:
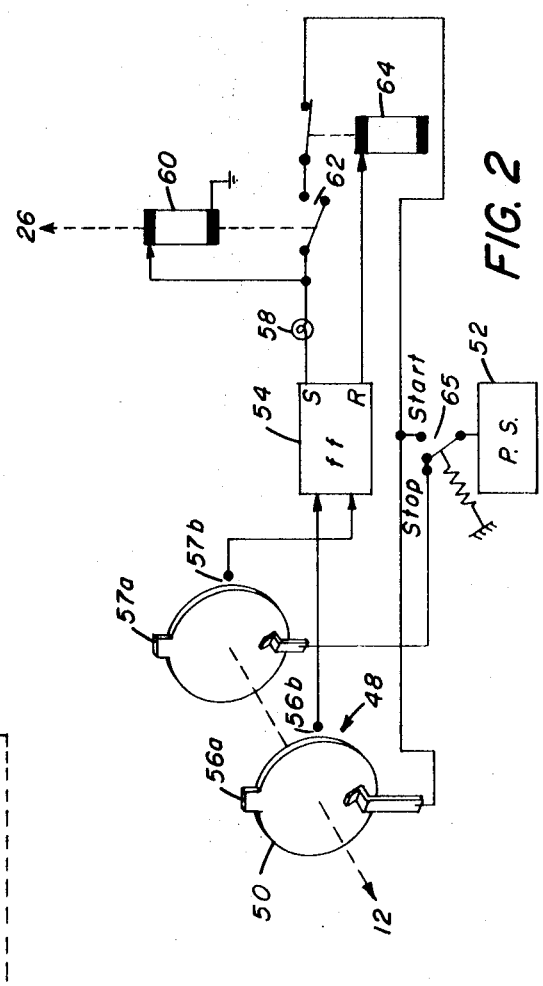
FIG. 2 illustrates a circuit ancillary to the apparatus of FIG. 1.

The one-turn actuator 24 may taken any of a variety of forms; and FIG. 2 shows one such actuator. A wafer switch 48 has its wafers 50, 51 excited by a power source 52. The wafers are rotated in unison with the member 10; the wafer 50 setting a flip-flop circuit 54 each time contacts 56a, b touch; and the wafer 51 resetting the flip-flop circuit 54 each time contacts 57a, b touch. When in its SET state, the flip-flop circuit 54 lights a lamp 58 and energizes a self-holding relay 60; and when energized, the relay 60 closes the switch 26, and holding contacts 62. When in its RESET state, the flip-flop circuit 54 energizes a relay 64 to break the self-holding contacts 62. Thus, to make an imbalance check of the member 10, a switch 65 is actuated (START) until the lamp 58 lights (i.e., the closing of the contacts 56a, b sets the flip-flop circuit 54); after which time the switch 65 is released to its STOP position. With the flip-flop circuit 54 set, the relay 60 pulls in, closing the switch 26 and permitting the $\Delta R$ signal to be produced for a full turn of the member 10. Since the switch 65 was released to its STOP position just after the $\Delta R$ signal started to be produced, the flip-flop circuit is reset when the contacts 57a, b touch, at which time the relay 64 is energized to deenergize the relay 60, and thereby end the imbalance computation 360° after it was begun.

Reference should be now be had to FIG. 3 which shows the invention applied to determine the imbalance of a web roll 70 as such roll is wound; Elements of FIG. 3 having corresponding parts in FIGS. 1 and 2 are similarly numbered, but are primed in FIG. 3; and FIG. 3 indicates how signals representing various nominal radii for respective discrete imbalance computations are produced.

The pickoff 14' is supported on a bracket 72 which is positionable by a worm-and-screw-type type drive 74. The worm-and-screw-type drive 74 is driven by means of a motor 76; and the bracket 72 is prevented from rotating by means of a slide 78. The slide 78 mounts on a guide rod 80 which is secured to and in a housing 82. The housing 82 includes a rack 84 which cooperates with a pinion 86 supported on the shaft of a roll radius detector 88 (e.g. a potentiometer) that produces a signal representing the amount of rotation of the pinion 86.

As the roll 70 grows in diameter the traveller (armature 16) of the pickoff 14' is driven to its limit of movement; during which time the signal output from the pickoff 14' also grows in amplitude. The signal output from the pickoff 14' is applied to a threshold circuit 90 which, when its received signal exceeds its threshold amount, causes a self-holding relay 92 (contacts 92a, b, c) to pull in. When the relay 92 pulls in, power is applied from a source 94 to the motor 76, thereby causing the worm-and-screw-type drive 74 to reposition the pickoff 14' in a direction which is radially away from the growing roll 70. Such repositioning of the pickoff 14' causes the output signal from the pickoff to dwindle; and as soon as such signal starts to change in polarity, a threshold circuit 96 produces an output to actuate a relay 98, thereby to break the energization of the relay 92. Thereafter, the output of the pickoff 14' may again grow to its limit, at which time the threshold circuit 90 will again trigger to reposition the pickoff 14'. FIG. 4 shows how the pickoff 14' output grows to a limit (+L); and how such output is effectively interrupted periodically for a duration ($d$) while the motor 76 drives. Note should be taken that the rate of growth of the pickoff output is greater than when the roll 70 is small, than when the roll is large; and that each "sawtooth" wave form does not necessarily indicate a discrete roll rotation.

Whenever it is desired to check roll imbalance, the one-turn actuator 24' is operated. So long as the pickoff 14' is not following up on the growing roll at this time (i.e. during "follow-up" imbalance computations are meaningless because the $\Delta R$ output is not referenced to a given nominal radius), an imbalance computation is made and applied through the switch 92C to a recording device 100. The one-turn actuator 24' allows $\Delta R$ signals to be detected (demodulator 22'), and resolved (resolver 28') into components which are then integrated (integrators 30', 32'). Whatever the nominal radius is for the imbalance computation in question—as determined by the roll radius detector 88—such radius is used to weight (multipliers 34', 36') the effect of radial variation vector components $\Delta R \cos \theta$, $\Delta R \sin \theta$; and so too, the heaviness (selector potentiometer 102) of the web material is used to weight the effect of the radial variation vector components. The weighted components, which are imbalance vector moments, are vectorially combined, ala FIG. 1, to produce the imbalance signal I.

It should be appreciated that as a web roll grows in size, its imbalance will, ordinarily, increase; and that with apparatus as indicated in FIG. 3, roll growth is automatically compensated for by continually making the nominal radius (radius detector 88) which is to be used for a given imbalance computation dependent on roll size. Thus, during winding of a roll, several imbalance measurements—each referenced to a respective nominal roll radius—may be taken and recorded (element 100) thereby, for example, to reflect on a continuing basis the quality of the web within the roll. By making the nominal radius for an imbalance computation dependent on roll size, a limited-range high gain pickoff 14' may be employed for detecting roll radial variations $\Delta R$. To do otherwise would require the (impractical) use of a broad band pickoff (and demodulator) (i.e. one capable of following both low frequency roll size changes, and the high frequency $\Delta R$ variations which are superposed on such roll size change).

The system of FIG. 3 (and FIG. 1) presupposes that the roll 70 is homogeneous from its periphery to its rotary axis. It frequently happens, however, that webs are homogeneously wound on cores (110, FIG. 5) which are, themselves, out of balance; and which cores may or may not have irregular peripheries. To check the aggregate imbalance of a roll wound on such a core, during the time that such roll is being wound, the invention proposes the following:

A. First measure the imbalance moments $I'_{x,y}$ of the core 110 by any prior art technique.

B. Then produce imbalance measures $I''_{x,y}$ by tracking the periphery of the core 110 with the FIG. 3 system before any web is wound on the core.

C. Measure the imbalance $I_{x,y}$ by tracking the periphery of the roll during the winding of same.

D. Algebraically combine measures $I'_{x,y}$, $I''_{x,y}$, and $I_{x,y}$ so that (if desired) may be vectorially added to produce the overall roll imbalance I. The philosophy of such a technique is that the periphery of the core has the same $\Delta R$ variations as the first layer of web wound on the core; and that since the web roll is homogeneous, the inside dimension of the web roll influences imbalance as well as the outer dimension of the roll; and that the aggregate of the imbalances of the roll and core portions totals the overall imbalance.

FIGS. 6 and 7 indicate summing devices 112, 114 which are adapted respectively to be connected into the FIG. 3 circuit at points P–P and Q–Q thereby to implement the technique described immediately above. After the imbalance $I'_{x,y}$ of the core is determined, potentiometers 116, 118 are appropriately set; and after the imbalance factors $I''_{x,y}$, caused by the inside dimensions of the web roll are determined, potentiometers 120, 122 are appropriately set. Thereafter, the overall imbalance may be periodically determined, as desired, by operation of the one-turn actuator 24'.

Where the roll in question has axial imbalance variations, averaging techniques may be employed.

Throughout the above description, reference has been made to various devices for performing arithmetic operations. Such devices are well known in the art, and examples of such may be found in standard computer textbooks.

The invention has been described in detail with particular reference to preferred embodiments thereof, but it will be understood that variations and modifications can be effected within the spirit and scope of the invention. For example, it would be within the scope of the invention, say, to add vectorially the signals $i_x$, $i_y$ into a signal $i$, then to weight same in accordance with the nominal radius R, etc. Also, though only the magnitude of the imbalance is indicated as being of interest, the angular location $\Phi$ of such imbalance may be easily determined also, e.g. $\Phi = \tan^{-1} iy/ix$, etc.

We claim:

1. Apparatus for use in producing a measure of a variable that relates to the imbalance of an element about an axis through such element comprising
   a. means for detecting radial variations about the periphery of such element and producing signals representative of said variations,
   b. means for receiving and resolving each such radial variation signal into orthogonal first and second signal components,
   c. means for integrating all said first signal components and all said second signal components to produce respective first and second integral signal components, and
   d. means for vectorially combining said first and second integral signal components into a resultant signal, said resultant signal being representative of the said measure.

2. The apparatus of claim 1 including means for varying said resultant signal in direct proportion to the radial size of said element.

3. The apparatus of claim 1 including means for varying said resultant signal in direct proportion to the weight of said element.

4. Apparatus for use in producing a measure of a variable that relates to the imbalance of a web roll about its rotary axis comprising
   a. means for producing signals representing variations in the radial dimension of said roll, and
   b. means for resolving each said signal into first and second orthogonal signal components,
   c. means for integrating said first and second signal components to produce first and second integral signal components, and
   d. means for vectorially combining said first and second integral component signals into a resultant thereof, said resultant signal being representative of the said measure.

5. The apparatus of claim 4 including means for varying said resultant signal in direct proportion to both the radial dimension and weight of said roll.

6. The apparatus of claim 5 wherein said signal-producing means is relatively positionable about the periphery of said roll and wherein said signal producing means is producing signals representing variations in the web roll radius taken with respect to a nominal radius for said roll, and wherein said means for integrating signals is means for selectively integrating its received signals over a single relative traversal of said signal producing means about the periphery of said roll.

7. The apparatus of claim 6 wherein said signal producing means has first and second parts which are relatively positionable within prescribed limits, wherein said apparatus includes means for positioning said signal-producing means radially relative to said roll, and wherein said means for varying said resultant signal is means for varying said resultant signal in direct proportion to the radial distance of said signal-producing means to the axis of said roll.

8. The apparatus of claim 7 wherein said means for positioning said signal-producing means include a motor and means for driving said motor in response to signals from said signal producing means which are above a certain threshold.

9. The method of determining the imbalance of a web roll wound on a core comprising the steps of
   a. determining the imbalance of the said core,
   b. determining the imbalance of the said web roll as caused by radial variations in both the inner and outer faces of the said roll, comprising the steps of
      1. determining radial variations of the inner face of the roll,
      2. resolving each said radial variation into first and second orthogonal components,
      3. integrating all said first and second components to obtain first and second integral components,
      4. vectorially combining said first and second integral components into a first resultant imbalance,
      5. determining the radial variations of the outer face of the roll,
      6. resolving each radial variation of the outer roll face into third and fourth orthogonal components,
      7. integrating all said third and fourth components to obtain third and fourth integral components,
      8. and vectorially combining said third and fourth integral components into a second resultant imbalance, and
   c. vectorially combining said first and second resultant imbalances into a resultant thereof.